Sept. 15, 1970   S. E. MILLER   3,529,205
SPATIALLY PERIODIC COUPLING FOR MODES HAVING DIFFERING
PROPAGATION CONSTANTS AND TRAVELING
WAVE TUBE UTILIZING SAME
Filed Oct. 21, 1968   6 Sheets-Sheet 1
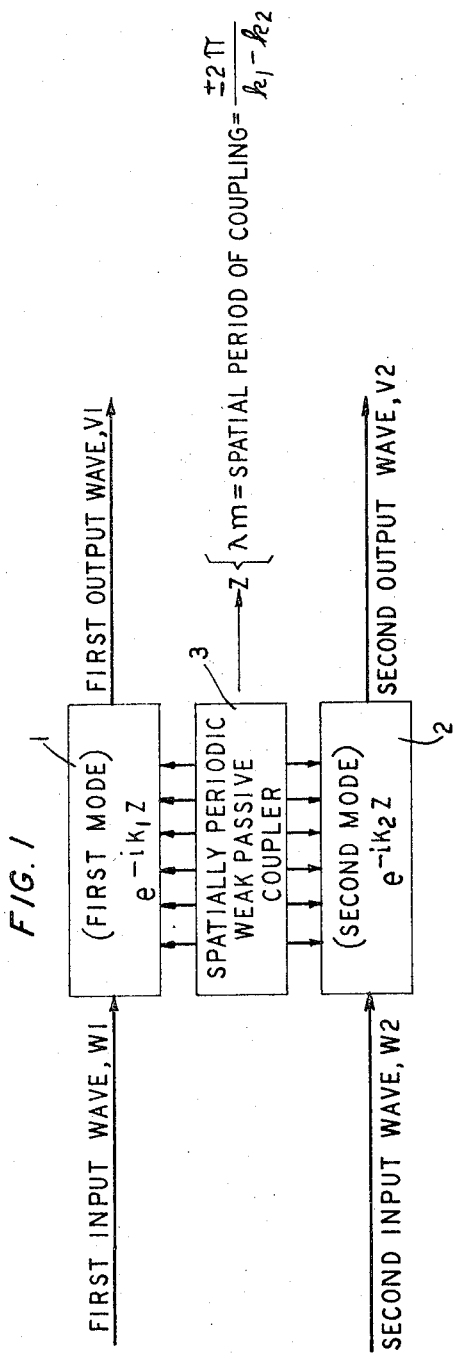
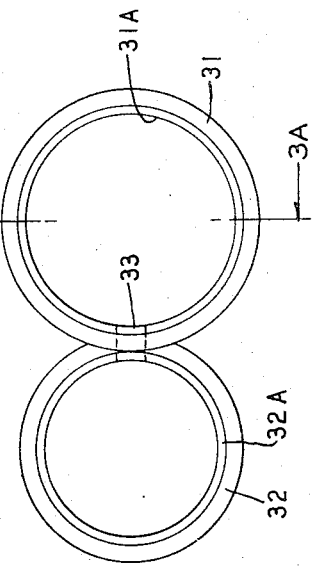
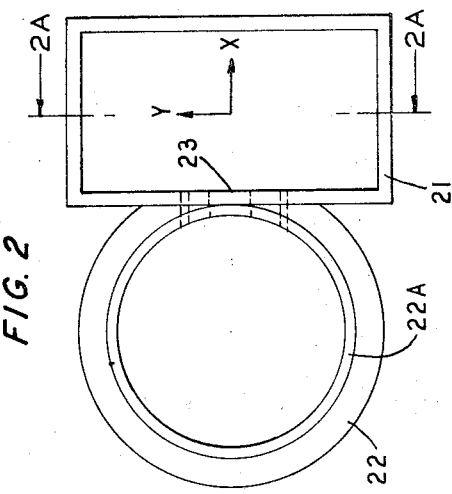
INVENTOR
S. E. MILLER
BY
ATTORNEY

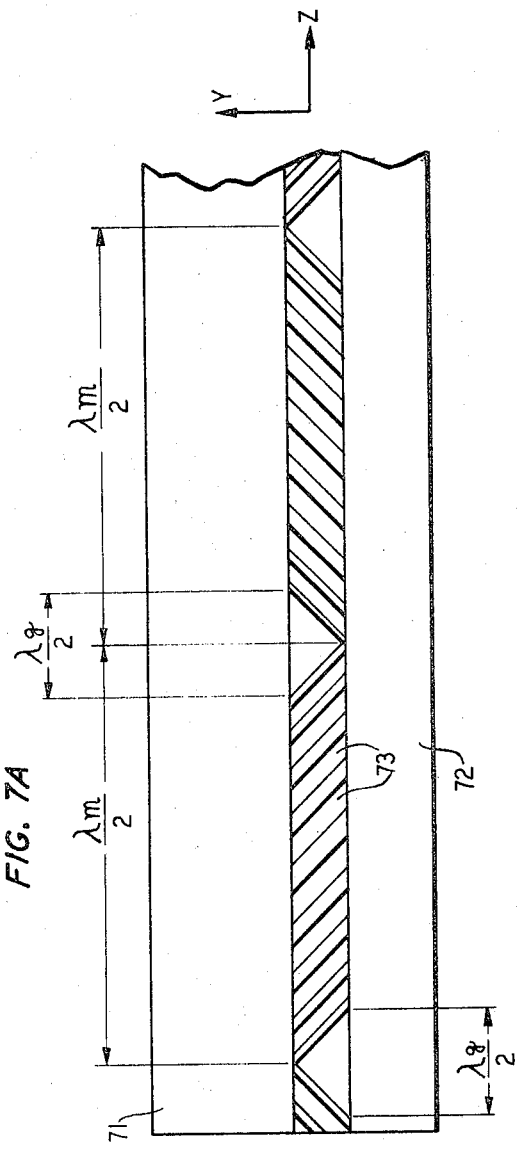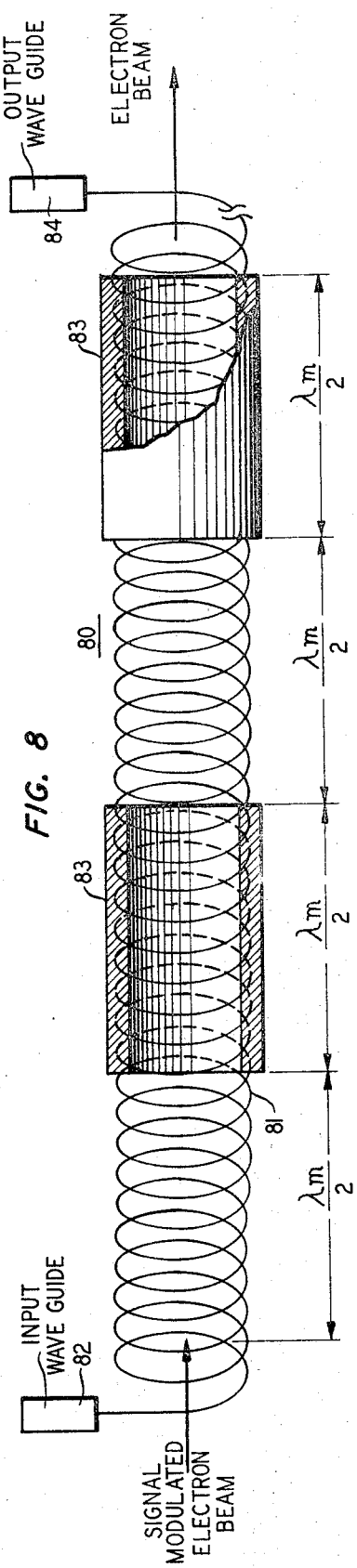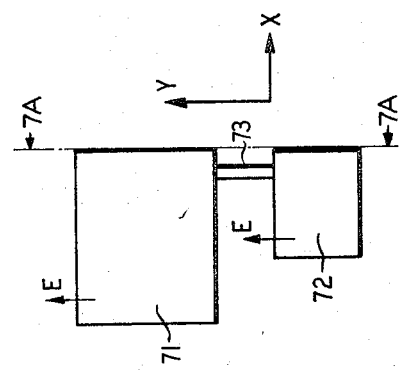

United States Patent Office 3,529,205
Patented Sept. 15, 1970

3,529,205
SPATIALLY PERIODIC COUPLING FOR MODES HAVING DIFFERING PROPAGATION CONSTANTS AND TRAVELING WAVE TUBE UTILIZING SAME
Stewart E. Miller, Middletown Township, Monmouth County, N.J., assignor to Bell Telephone Laboratories, Incorporated, Murray Hill, N.J., a corporation of New York
Filed Oct. 21, 1968, Ser. No. 769,108
Int. Cl. H01j *25/34;* H01p *3/20, 5/08*
U.S. Cl. 315—3.5
22 Claims

ABSTRACT OF THE DISCLOSURE

In a passive directional coupler with or without mode conversion, optimum transfer of energy from a first wave having a propagation constant $k_1$ to a second wave having a propagation constant $k_2$ is obtained by means of a weak coupling coefficient which has a spatial periodicity $\lambda_m$ given by:

$$\lambda_m = 2\pi/(k_1 - k_2)$$

FIELD OF THE INVENTION

This invention relates to electromagnetic wave directional couplers with or without mode conversion, and in particular, to couplers for coupling waveguide modes having differing propagation constants.

BACKGROUND OF THE INVENTION

In many electromagnetic wave transmission systems, a first mode is relatively easy to excite but relatively difficult to propagate efficiently, whereas a second mode is relatively difficult to excite but relatively easy to propagate efficiently. These first and second modes generally have different propagation constants, and may exist in the same physical waveguide or in physically distant first and second waveguides, respectively. It is therefore desirable to have a way for coupling these modes in order to convert electromagnetic wave energy originally excited and propagating in the first mode into electromagnetic energy propagating in the second mode.

In the prior art, as exemplified by my previous U.S. patents, such as 2,748,350 issued on May 29, 1956; 2,820,-202 issued on Jan. 14, 1958; 2,948,864 issued on Aug. 9, 1960; and 3,020,495 issued on Feb. 6, 1962; ways for coupling such first and second modes are described. However, for maximum transfer of energy from the first to the second mode, the fabrication of appropriate coupling means hitherto has been rather difficult, requiring complicated and expensive shaping of the waveguide walls. This complication arises, among other factors, from the necessity of satisfying certain relations between the coupling coefficient $C_{21}$ and the difference in propagation constants $(k_2 - k_1)$ between the first and second modes.

SUMMARY OF THE INVENTION

According to this invention, a region with a "weak" coupling coefficient $C_{21}$ having a spatial periodicity $\lambda_m$ is utilized in a "passive" directional coupler (with or without mode conversion), in order to transfer energy from a first mode having a guide wavelength $\lambda_1$ to a second "dissimilar" mode having a guide wavelength $\lambda_2$. By "dissimilar" is meant that the mode wavelengths $\lambda_1$ and $\lambda_2$ are not equal. These modes either may be physically present and superposed in the same waveguide structure or may be present in distinct first and second mutually coupled waveguide structures. By "weak" coupling is meant that the amount of energy transferred from one mode to the other during any single spatial period $\lambda_m$ of the coupling coefficient $C_{21}$ is approximately at least an order of magnitude less than the sum of the wave energy present in each of these modes. Finally, by "passive" couplers is meant that throughout the coupler the total energy flux at any given frequency remains constant, except for incidental losses.

Advantageously for maximum transfer of energy from one mode to the other mode, the spatial period $\lambda_m$ of the coupling coefficient $C_{21}$ in this invention satisfies:

$$\lambda_m = \pm \frac{\lambda_1 \lambda_2}{\lambda_1 - \lambda_1} \tag{1}$$

It should be understood that the $\pm$ sign in Eq. 1 is chosen in order to make the spatial period $\lambda_m$ a physically meaningful (positive) quantity. Likewise it should be understood that even if Eq. 1 is only approximately satisfied, nevertheless appreciable energy transfer can occur.

In general, for a given first and a given second mode, Eq. 1 is satisfied exactly only for a single frequency $f_0$. Thus, appreciable energy transfer from one mode to the other occurs for a range of frequencies "centered" at $f_0$. The bandwidth of this range of frequencies is approximately inversely proportional to the number N of spatial periods $\lambda_m$ in the coupling. On the other hand, the amount of energy transfer at $f_0$ is approximately directly proportional to N. Thus, frequency selectivity as well as the amount of energy transfer from one mode to the other, both increase as the number N of spatial periods $\lambda_m$ in a given type of coupling is increased. Hence, a directional coupler structure, with a "weak" but spatially periodic coupling coefficient in accordance with the above Eq. 1, can be also used as a bandpass filter in accordance with another aspect of this invention. In such a case, increasing the number N of the spatial periods $\lambda_m$ in the coupling coefficient $C_{21}$ is associated with narrowing the bandpass and increasing the efficiency.

In terms of the "dissimilar" (unequal) propagation constants $k_1$ and $k_2$ of the first and second modes, it is obvious from Eq. 1 that the spatial period $\lambda_m$ for maximum energy transfer may also be expressed as:

$$\lambda_m = \pm 2\pi/(k_1 - k_2) \tag{2}$$

Of course, if a spatially periodic coupling "weak" coefficient $C_{21}$ merely contains a significant Fourier component having a spatial period satisfying Eq. 1, significant energy transfer from one mode to the other still will be obtained by reason of this spatial period in accordance with this invention. Thus, for a "square wave" type of coupling coefficient, e.g., $C_{21}$ is alternately 0 and 1 over successive distances $\lambda_m/2$, significant energy transfer occurs provided $\lambda_m$ at least approximately satisfies:

$$\lambda_m = \pm \frac{p \lambda_1 \lambda_2}{\lambda_1 - \lambda_2} \tag{1A}$$

with $$p = \text{odd integer} \tag{1B}$$

More generally, especially in cases where the propagation "constants" $k_1$ and $k_2$ are functions of position along the waveguide(s), the quantities $\lambda_1$ and $\lambda_2$ as well as $k_1$ and $k_2$ appearing in Eqs. 1 and 2 above should be regard as the averages of these respective quantities. Thus, the spatial periodicity $\lambda_m$ of the coupling will in all events correspond to a distance along the waveguide(s) over which the first mode undergoes a phase change which differs by $\pm 2\pi p$ relative to the phase change of the second mode, with $p$ being an odd integer.

The explanation of energy transfer by means of a periodic coupling interaction may be easily understood by considering the effect of this type of interaction between the first mode and the second mode. The coefficient of coupling $C_{21}$ produces an interaction between those modes along a distance (from 0 to L) parallel to the propogation direction of the modes, which causes a transfer of energy from the first to the second mode. This energy transfer, in the absence of losses, is proportional to the square of:

$$\int_0^L e^{ik_2z}(C_{21})e^{-ik_1z}dz = \int_0^L C_{21}e^{+i(k_2-k_1)z}dz \quad (3)$$

where $z$ is the position coordinate along the direction of propagation. See, for example, Eq. 8 in my previous U.S. Pat. No. 2,748,350 issued on May 29, 1956. Thus, maximum energy transfer will be obtained if $C_{21}$ contains an exponential factor $e^{-i(k_2-k_1)z}$, which cancels the factor $e^{+i(k_2-k_1)z}$ in the integrand, and thereby maximizes the value of the integral in Eq. 3. In view of the identity:

$$\exp[-i(k_2-k_1)z] = \cos(k_2-k_1)z$$
$$-i\sin(k_2-k_1)z \quad (4)$$

there will also be significant energy transfer if the coupling coefficient $C_{21}$ has any significant Fourier component with spatial perodicity $\lambda_m$ given at least approximately by Eq. 2 above. In such cases, this Fourier component will "resonate" at least approximately with the factor $e^{i(k_2-k_1)z}$ appearing in the integrand of Eq. 3 above thereby affording significant transfer of energy. However, the maximum amount of energy transfer for a given maximum coupling coefficient is obtained in cases where the coupling coefficient of $C_{21}$ itself satisfies:

$$C_{21} = iC[\cos(k_2-k_1)z - i\sin(k_2-k_1)z] \quad (5)$$

where C is a (coupling) constant.

It has been found by calculation that the previously known results of the theory of spatially constant coupling applies to spatially periodic coupling having N spatial periods equal to $\lambda_m$, provided that the quantity $$(k_2-k_1) \pm 2\pi/\lambda_m$$

is substituted for $(k_2-k_1)$ in the previous results. Assuming no loss, for example, the energy transfer in a structure having a coupling coefficient $C_{21}$ of the form:

$$C_{21} = iC[\cos(2\pi z/\lambda_m) - i\sin(2\pi z/\lambda_m)] \quad (6)$$

will be proportional to the square of $E_2$ given by $$|E_2| = \frac{1}{\sqrt{1+D^2}} \sin\{CL\sqrt{1+D^2}\} \quad (7)$$

wherein $$D^2 = \left(\frac{k_2-k_1-2\pi/\lambda_m}{2C}\right) \quad (8)$$

For definitiveness in algebraic signs, it has been assumed that $k_2$ is greater than $k_1$ in this Eq. 8. From Eq. 2 above, it can be seen that $D=0$ at midband according to this invention, so that complete transfer ($E_2=1$) occurs provided the length L along the coupling structure satisfies:

$$CL = \pi/2 \quad (9)$$

Furthermore, for complete transfer at midband $f_0$ in a coupling structure satisfying this Eq. 9, the first null in the transfer occurs at frequency $f_1$ (different from $f_0$) which makes $\sqrt{1+D^2}$ equal to 2, i.e., $D=\sqrt{3}$. In view of the fact that the magnitude of $(f_1-f_0)$ increases from zero monotonically with $(k_2-k_1-2\pi/\lambda_m)$ in this coupling structure satisfying Eq. 9 above, larger values of C (smaller values of N) will yield this value of $D=\sqrt{3}$ for larger values of the magnitude of $(f_1-f_0)$. Hence larger values of C (smaller value of N) are associated with broadband coupling, whereas smaller values of C (larger values of N) are associated with narrowband coupling, with complete transfer at midband.

Even if Eq. 9 above is not satisfied at midband ($D=0$) in this invention, nevertheless significant although not complete energy transfer occurs in accordance with Eq. 7 above which may be rewritten for convenience as $$|E_2| = CL\frac{\sin CL(\sqrt{1+D^2})}{(CL\sqrt{1+D^2})} \quad (10)$$

In general, again broadband coupling will be obtained (for fixed CL product) by means of relatively small values of N; and narrowband coupling will be obtained by means of relatively large values of N, where $$N = L/\lambda_m$$

whether or not an integer.

A purely spatially sinusoidal type of coupling $C_{21}=iC\sin 2\pi z/\lambda_m$ also yields results substantially the same as previously found for constant coupling provided that $k_2-k_1-2\pi/\lambda_m$ is substituted for $k_2-k_1$, and an effective coupling coefficient equal to $C/2$ is substituted for the constant coefficient appearing in the previous results. Thus, spatially sinusoidal coupling yields similar results as the exponetial coupling expressed in Eq. 6 above, including the complete transfer condition expressed in Eq. 9 (but now substituting the effective coupling coefficient $C/2$ for C therein).

For a "square wave" type of spatially periodic coefficient of coupling having spatially alternating values of $+C$ and $-C$, or 0 and 2C, calculations have shown that the previously known results for constant coupling are obtained provided that $(k_2-k_1)$ is replaced by $$k_2-k_1-\frac{2\pi}{\lambda_m}\sqrt{1-\left(\frac{C\lambda_m}{\pi}\right)^2}$$

and the coupling constant replaced by an effective coupling coefficient equal to $2C/\pi$. In view of the "weak" coupling used in this invention, $C\lambda_m$ is small compared with unity and may be neglected under this square root. Thus, square wave spatially periodic weak coupling leads to Eq. 2 above at midband, at least in the weak coupling approximation. Moreover, square wave spatially periodic coupling yields similar results as the exponential coupling expressed in Eq. 6 above, including the complete transfer condition expressed in Eq. 9 above (but now substituting the effective coupling coefficient $2C/\pi$ for C therein).

In those embodiments of this invention in which it is desired to couple the modes in two physically distinct waveguides, spatially periodic coupling may be achieved for example by means of a spatially periodic array of slots in a common wall between the waveguides. On the other hand, in those embodiments of this invention in which it is desired to couple the modes supported in the same single physical waveguide, periodic coupling may be achieved for example by introducing a spatially periodic perturbation produced by dielectric sheets. In all cases, according to this invention, the spatial periodicity satisfies Eq. 1 above at the midband frequency, $f_0$. Moreover, spatially periodic, weak, passive coupling according to this invention may be used to couple the modes of any waves having different propagation constants, such as the electron space charge wave and the "slow" electromagnetic wave in a travelling wave tube.

This invention, together with its features, advantages, and objects may be better understood from the following detailed description when read in connection with the drawings in which:

FIG. 1 is a general schematic illustration of the spatially periodic coupling according to this invention;

FIG. 2 is a front view of a rectangular and a circular waveguide which support modes having different propagation constants to be coupled according to this invention;

FIG. 7 is a front view of a dielectric waveguide structure with spatially periodic coupling illustrated in side view FIG. 7A, according to another specific embodiment of this invention; and FIG. 8 is a schematic side view, partly in cross-section, of a travelling wave tube structure, with spatially periodic coupling according to yet another specific embodiment of this invention.

DETAILED DESCRIPTION

Figure 2A:
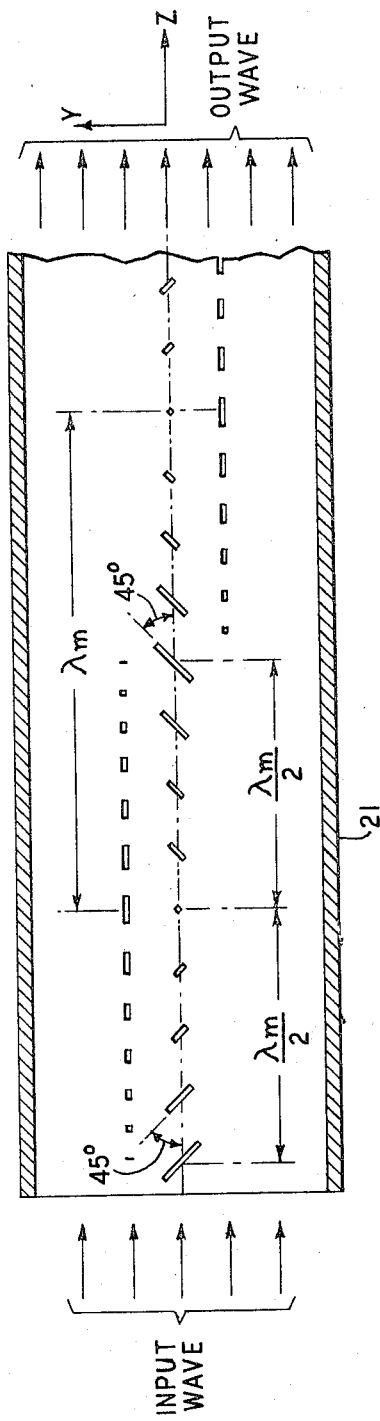
FIG. 2A is a cross-sectional view showing the spatially periodic coupling slots in the common waveguide wall between the rectangular and circular waveguides illustrated in FIG. 1, according to a specific embodiment of this invention.

The general schematic illustration of this invention is shown in FIG. 1. A First Input Wave W1 and a Second Input Wave W2 are incident upon first and second waveguides 1 and 2 respectively. It should be understood that the waveguides 1 and 2 shown in FIG. 1 may form a single waveguide structure which supports the First and Second Modes in the same physical space within the waveguide structure.

In general, the First and Second Input Waves have the same frequency and are mutually coherent, although in some applications one of these Input Waves may contain no wave energy at all. The First Input Wave excites, among others, a First Mode in waveguide 1 having a guide wavelength $\lambda_1$; while the Second Input Wave (if any) excites, among others, a Second Mode in waveguide 2 having a guide wavelength $\lambda_2$. These First and Second Modes are coupled by means of the Spatially Periodic Weak Passive Coupler 3, so that energy is transferred between these Modes. The spatial period in the coupling coefficient in the Coupler 3 is $\lambda_m$, as given by Eq. 1, or its equivalent Eq. 2, above. As a result, the First Output Wave V1 exiting from the first waveguide 1 has a different amplitude and intensity from the First Input Wave W1; and the Second Output Wave W2 exiting from the second waveguide 2 has a different amplitude and intensity from the Second Input Wave W2. In other words, energy is transferred between the First Wave and the Second Wave. Energy at every frequency is conserved throughout (except for loss incidental to the waveguides 1 and 2 or the Coupler 3), i.e. the Coupler 3 is passive and may utilize linear materials or means for coupling.

It should be emphasized again that the amplitude and intensity of the Second Input Wave may be zero, especially in cases where it is desired to convert available wave energy in the First Mode into wave energy in the Second Mode.

It should be appreciated that the arrangement shown in FIG. 1 may also be used as a band filter, in view of the fact that the relation given by Eq. 1 for maximum energy transfer will be satisfied exactly only for a single frequency $f_0$, and will be satisfied even approximately only for a band of frequencies. Thus, appreciable energy will be transferred from one wave to the other only for those frequencies within the band, by reason of the transfer of wave energy from the First Mode to the Second Mode, for example. Consequently, the arrangement shown in FIG. 1 may be used as a bandpass filter, in which the spatial periodicity in the Coupler 3 satisfies Eq. 1 above at midband. As used as such a filter, for example, the First Input Wave W1 contains the wave energy to be filtered, and the Second Input Wave W2 contains no wave energy at all. After passage through the waveguides 1 and 2 with the Spatially Periodic Coupling 3, the Second Output Wave V2 will contain appreciable wave energy at only those frequencies which are in the pass band. The halfwidth of this pass band is reduced by increasing the number N of spatial periods of length $\lambda_m$; while the amount of energy in the pass band transferred from the First to the Second Wave, hence the coupling efficiency, is directly proportional to N.

FIG. 2 illustrates the front view of a first hollow metallic rectangular tubular waveguide 21 coupled to a second hollow metallic circular tubular waveguide 22 by means of slots 23 in the common wall between these waveguides 21 and 22. A thin dielectric lining 22A breaks the $TE_{01}$–$TE_{11}$ degeneracy in these circular modes in the circular waveguide 22. The details of the slots 23 are shown in the cross-sectional view FIG. 2A. In accordance with this invention, these slots 23 produce a spatially periodic coupling, of the type embodied in Eq. 5 above, between the rectangular electromagnetic $TE_{10}$ mode in the rectangular waveguide 21 and the circularly symmetric electromagnetic $TE_{01}$ mode of the circular waveguide 22. The longitudinally magnetic intensity $H_z$ of both these modes are mutually weakly and passively coupled by the horizontal slots which are located off the centerline $z$ axis, at positions which are equidistant from this centerline but each interval $\lambda_m/2$ on opposite sides thereof. Moreover, the transverse magnetic intensity of the said rectangular $TE_{10}$ mode is coupled to the longitudinal magnetic intensity of the said circular $TE_{01}$ mode by means of the on-axis slots making an angle of 45° with the $z$-axis. The magnitude of the coefficient of the coupling $C_{21}$ at any location is proportional to the areas of the slots in the neighborhood of the location. Advantageously, these areas of the slots are made to produce the sinusoidal variation in $C_{21}$ as a function of $z$, this variation having a spatial period $\lambda_m$ given by Eq. 1 or its equivalent Eq. 2 above. It should be understood that in Eq. 1, $\lambda_1$ is now the wavelength constant of the rectangular $TE_{10}$ mode of waveguide 21, whereas $\lambda_2$ is the wavelength constant of the circular $TE_{01}$ mode of waveguide 21.

A sinusoidal spatial variation in $C_{21}$ entails a change in sign ("phase reversal") every half-period interval $\lambda_m/2$. The phase reversal in the coefficient of coupling $C_{21}$, to be produced by the off-axis slots, is realized in FIG. 2A by successive reversals (every $\lambda_m/2$) of the slot position with respect to the centerline $z$ axis; whereas the phase reversal in the coefficient of coupling, to be produced by the on-axis slots, is realized in FIG. 2A by reversal (every $\lambda_m/2$) of the slant angle of the slots from +45° to −45° with respect to the centerline $z$ axis. These phase reversals are ultimately produced by the interaction of the reversal of slot position with the phase of the coupled magnetic intensity in the rectangular $TE_{10}$ mode. Also, the spatial phase difference inherently existing between the sine and the cosine term in the coupling coefficient $C_{21}$ is realized in FIG. 2A by having the on-axis slots arranged 90° out of spatial phase with respect to the off-axis slots; that is, the maximum sized on-axis slots occur at the same value of $z$ as the minimum sized off-axis slots, and vice versa. Finally, the difference by the factor $(-i)$ between the sine and cosine terms in $C_{21}$ as given in Eq. 5 above, is realized by the 90° phase difference in the rectangular modes of the coupled magnetic fields themselves, off-axis vs. on-axis.

Figure 2B:
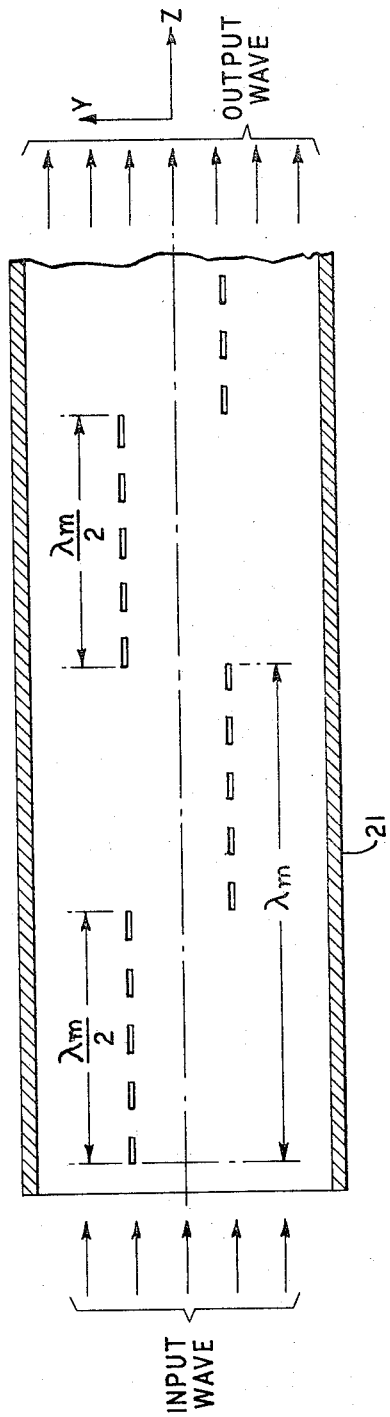
FIG. 2B is a cross-sectional view showing the spatially periodic coupling slots in the common waveguide wall between the rectangular and circular waveguides illustrated in FIG. 1, according to another specific embodiment of this invention.

Instead of the coupling coefficient $C_{21}$ having the form embodied in Eq. 5 and realized by the structure shown in FIG. 2A, FIG. 2B shows a "symmetrical square wave" type of coupling produced by the illustrated configuration of slots in the common wall between the rectangular waveguide 21 and the circular waveguide 22. This arrangement is also useful for coupling the electromagnetic rectangular $TE_{10}$ mode of waveguide 21 with the circular electromagnetic $TE_{01}$ mode of waveguide 22. The change in sign of "symmetrical square wave" coupling is produced by reason of the successive arrangement as shown in FIG. 2B of each half-period interval ($\lambda_m/2$) of substantially identical slots alternately on opposite sides of the centerline and equidistant therefrom, in combination with the opposite phase of the coupled longitudinal magnetic intensity in the rectangular $TE_{10}$ mode on alternate sides of this centerline $z$ axis.

In using the periodic coupling structure illustrated in FIG. 2 as a directional coupler with the common-wall slot configuration shown in either FIG. 2A or FIG. 2B, in one particularly useful application, the input wave is incident upon the rectangular waveguide 21 and the useful output wave exits from the circular waveguide 22. In this way, the input wave excites the rectangular $TE_{10}$ mode in waveguide 21, and this rectangular $TE_{10}$ mode in turn excites the circular $TE_{01}$ mode in waveguide 22. This latter excitation of the circular $TE_{01}$ mode occurs most efficiently if the spatial period $\lambda_m$ of the distribution of slots in the common wall satisfies Eq. 1 above. Thus, the more easily excited rectangular $TE_{10}$ mode in the waveguide 21 is converted into the more easily transmitted circular $TE_{01}$ mode in the waveguide 22.

Coupling of other modes may be achieved with waveguide coupling structures shown in FIG. 2B, so long as the mathematical product of the coupled fields in the coupled modes is nonzero at the location of the slots and Eq. 1 is satisfied, according to the invention.

Figure 3A:
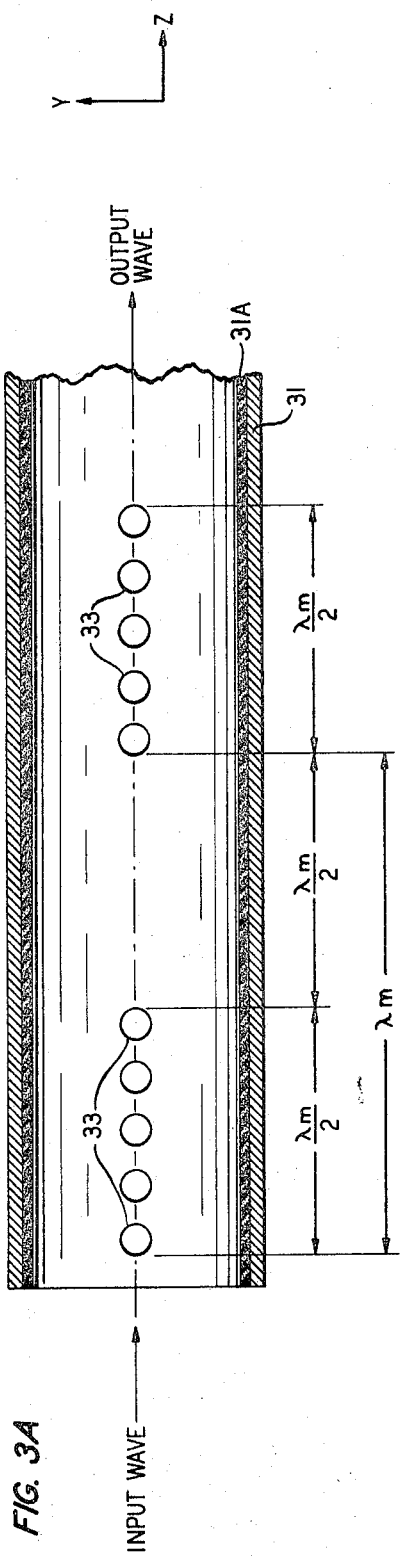
FIG. 3 is a front view of circular waveguides, with spatially periodic coupling in the common wall illustrated in the cross-sectional view of FIG. 3A, according to another specific embodiment of this invention.

The embodiment illustrated in FIG. 3 shows a first circular hollow metallic tubular waveguide 31 and a second circular hollow metallic tubular waveguide 32 with a common wall therebetween. In this common wall are located a spatially periodic array of discrete substantially identical circular slots 33, for weakly and passively coupling the modes in the waveguides 31 and 32, as shown for example in FIG. 3A. These circular slots 33 are present only at every other spatial interval equal to a half-period ($\lambda_m/2$) along the common wall between the circular waveguides 31 and 32, thereby giving rise to the spatial periodicity $\lambda_m$ of the coupling. The circular slots 33 are otherwise mutually equidistant and produce a "raised square wave" type of periodic coupling. In accordance with the invention, the spatial period $\lambda_m$ of the array of slots is given by Eq. 1, where now $\lambda_1$ and $\lambda_2$ are the guide wavelengths of the first and second modes, the first mode in waveguide 31 to be coupled to the second mode in waveguide 32. For example, the first mode is the more easily excited circular $TE_{11}$, and the second mode is the more easily transmitted circularly symmetric $TE_{01}$. Advantageously, dielectric linings 31A and 32A break up the degeneracy between the circular $TM_{11}$ and $TE_{01}$ in the waveguides 31 and 32, respectively.

The distance between centers of discrete neighboring slots in a given half-period $\lambda_m/2$, as shown in FIG. 3A, advantageously is not more than approximately one-third the wavelength in either of the waveguides 31 and 32. In this way, the type of coupling produced by this configuration of slots closely approximates that of "raised square wave." The discrete slots may be used to couple any modes in waveguides 31 and 32 which have a nonvanishing mathematical product of field strengths to be coupled at the location of the slots. Just as in the embodiment shown in FIG. 2, the waveguides 31 and 32 coupled as shown in FIG. 3A may also be used for filtering purposes.

Figure 4:
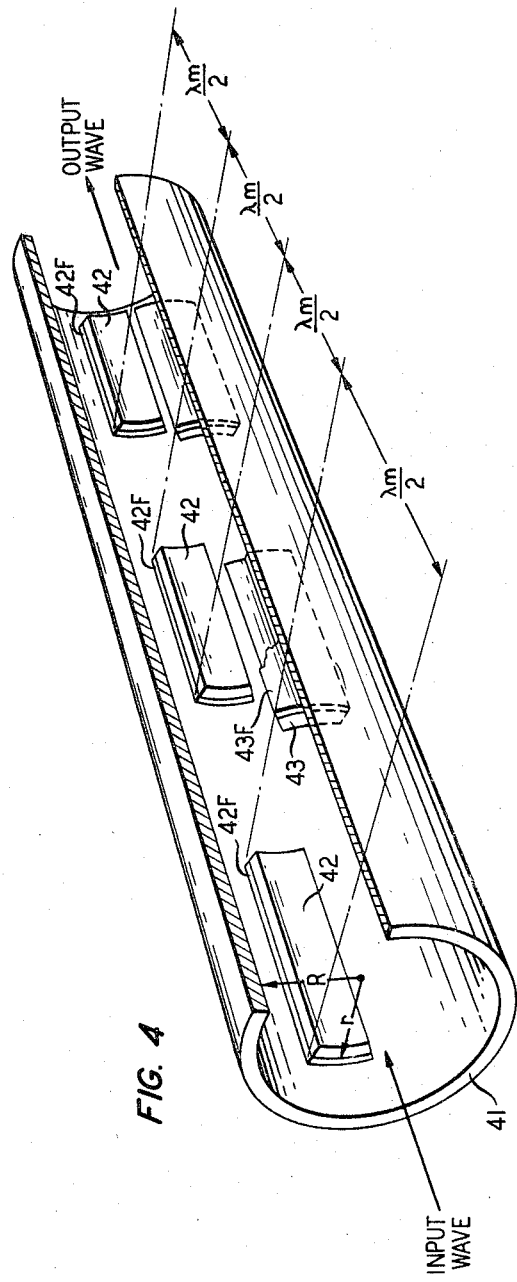
FIG. 4 is a perspective view of a circular waveguide with spatially periodic coupling according to still another specific embodiment of this invention.

The embodiment illustrated in FIG. 4 shows a circular hollow metallic tubular waveguide 41 with spatially periodical coupling for first and second modes within the same physical waveguide structure. In particular, the spatially periodic coupling is produced by substantially identical thin dielectric coupling sheets 42 and 43, all of length $\lambda_m/2$, located on successive alternate sides with respect to a plane containing a diameter of the waveguide 41. In accordance with this invention, it should be understood that $\lambda_m$ satisfies Equation 1 above at midband. The dielectric constant of the coupling sheets 42 and 43 is significantly greater than that of the surrounding space in the tubular waveguide 41, in order to produce a significant pertubation and hence coupling of modes. Thereby a "symmetrical square wave" type of mode coupling is produced with a spatial periodicity in accordance with the invention. This arrangement shown in FIG. 4 is useful, for example, for coupling the more easily excited circular electromagnetic $TE_{11}$ mode with the more easily propagated circular electromagnetic $TE_{01}$ mode. For a waveguide 41 of radius R, maximum coupling of these modes may be obtained by locating the dielectric sheets 42 and 43 at an average distance $r$ from the axis of the waveguide 41 where the magnitude of the mathematical product of the coupled fields of these two modes is a maximum. The dielectric coupling sheets 42 and 43 may be conveniently supported mechanically upon the wall of the waveguide 41 by relatively low dielectric foam support linings 42F and 43F.

Other modes may be similarly coupled in this invention by means of coupling configurations similar to that shown in FIG. 4, satisfying Equation 1 at midband.

Figure 4A:
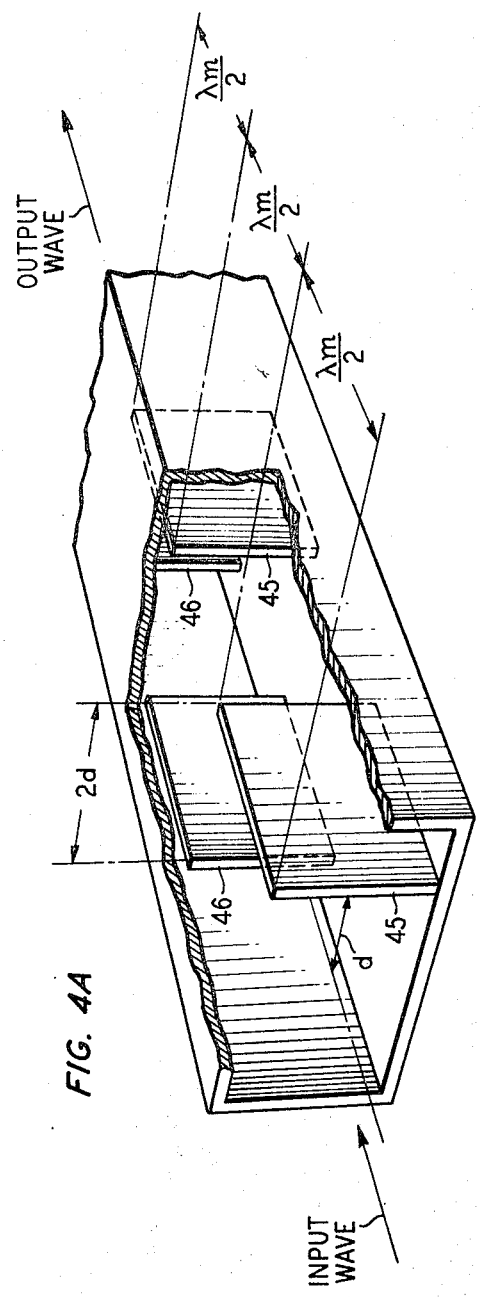
FIG. 4A is a perspective view of a rectangular waveguide with spatially periodic coupling according to still another specific embodiment of this invention.

The embodiment illustrated in FIG. 4A shows a hollow tubular rectangular metallic waveguide 44, with spatially periodic coupling provided by means of the substantially identical thin dielectric coupling sheets 45 and 46, all of length $\lambda_m/2$ satisfying Equation 1 at midband. Again just as in the example shown in FIG. 4, the dielectric constant of the sheets is significantly greater than that of the surrounding space in the waveguide 44. Successive coupling sheets 45 and 46 are located in the waveguide 44 successively on opposite sides of, but otherwise equidistant from, the centerline of the rectangular waveguide 44. Thereby there is provided a "symmetrical square wave" type of periodic mode coupling. Denoting the width of the waveguide 44 by $2a$, for maximum coupling coefficient for the particular modes rectangular electromagnetic $TE_{10}$ and rectangular electromagnetic $TE_{20}$, the average distance $d$ of the dielectric sheets 45 and 46 from the centerline of the waveguide is equal to $(0.392)a$, that is, where the product of the interacting coupled fields is a maximum.

Other modes may be similarly coupled in this invention by means of coupling configurations similar to that shown in FIG. 4A, satisfying Equation 1 at midband, but with suitable modification in the location of the dielectric coupling sheets 45 and 46 with respect to the centerline.

Figure 5A:
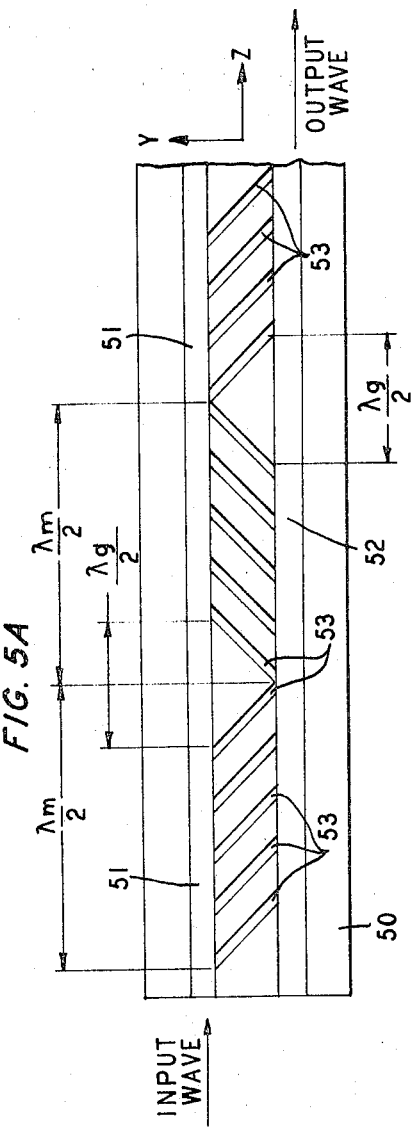
FIG. 5 is a front view of a dielectric waveguide structure, with spatially periodic coupling illustrated in FIG. 5A, or FIG. 5B alternatively, according to still other alternate specific embodiments of this invention.
Figure 5B:
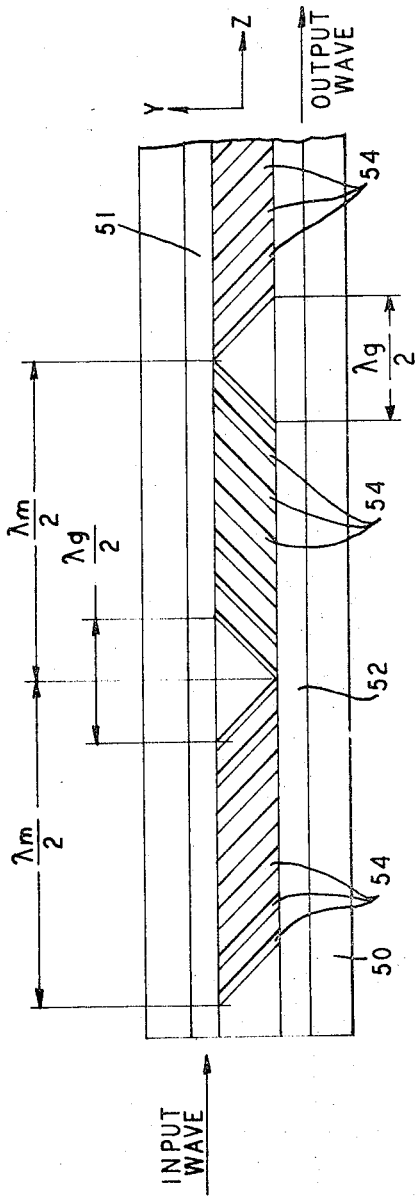
Figure 5:
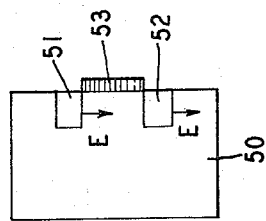

FIG. 5 is a side view of a solid tubular dielectric waveguide structure embedded in a substrate 50, in which a first optical mode in the solid rectangular dielectric region forming the waveguide 51 is coupled to a second optical mode in the solid rectangular dielectric waveguide 52 by means of an array of dielectric coupling elements, the dielectric coupling strips 53. These dielectric coupling strips 53 are arranged in a spatially periodic array, for example, as shown in the side view of FIG. 5A. The dielectric strips 53 couple the $y$ component of the electric field in the first and second modes. Typically, the waveguides 51 and 52 are made of a material having a dielectric constant significantly higher than that of the substrate 50, in order to support the first and second modes in the waveguides. The coupling strips 53 also have a higher dielectric constant than the substrate 50; and they are all substantially identical and parallel except for a reversal of slant every interval equal to $\lambda_m/2$. These strips 53 may be deposited using photolithographic techniques upon the substrate 50.

The slant of the coupling strips 53 is, as just mentioned, periodically reversed every distance interval equal to $\lambda_m/2$ along the waveguides 51 and 52. This reversal of slant gives rise to a physical displacement, advantageously equal to $\lambda_g/2$, between the first coupling strip in a given spatial period $\lambda_m/2$ and the last coupling strip in the previous spatial period (also $\lambda_m/2$). Here $\lambda_g$ denotes the approximate guide wavelength of either the first mode, or the second mode, or an average thereof. Moreover, $\lambda_m$ is selected to satisfy Equation 1 above at midband, in accordance with the invention; where now $\lambda_1$ and $\lambda_2$ are the wavelengths of the first and second modes, respectively, in the waveguides 51 and 52, respectively.

The configuration shown in FIG. 5A yields "symmetrical square wave" type of spatially periodic coupling, in accordance with the invention, by reason of the spatially periodic change in algebraic sign of the coupling coefficient produced by the periodic reversal in the slant direction of the coupling strips 53.

Tapering the width of the coupling strips 54, as shown in FIG. 5B, sinusoidally with distance along the waveguides 51 and 52 may be used to yield sinusoidal type of spatially periodic coupling. The dielectric waveguide structures with periodic coupling, as shown in FIG. 5A or FIG. 5B, are useful for filtering the input wave of a laser beam, for example, which has a nonvanishing $y$ component of electric field E.

Figure 6:
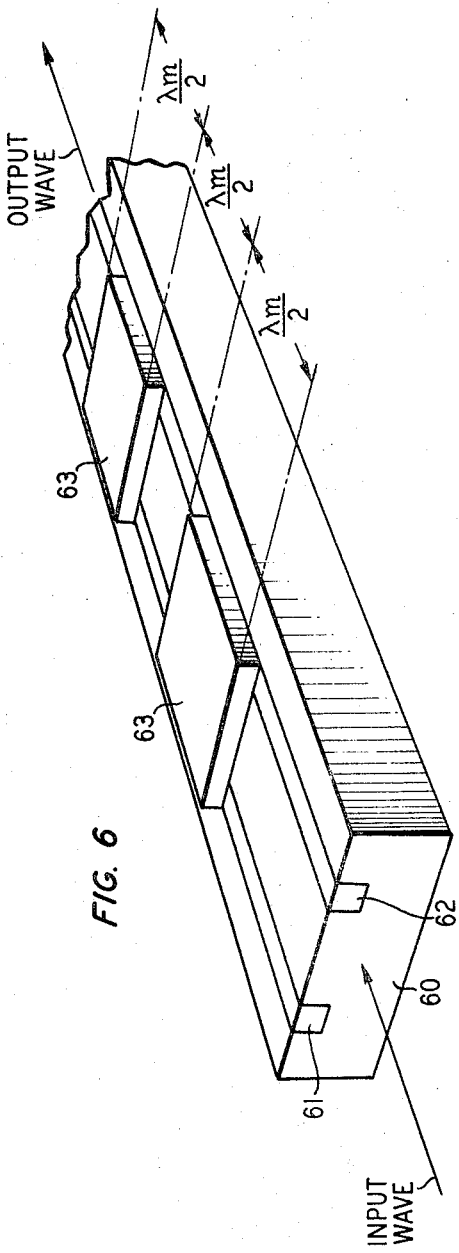
FIG. 6 is a perspective view of a dielectric waveguide structure, with spatially periodic coupling according to yet another specific embodiment of this invention.

FIG. 6 shows in perspective a waveguide structure consisting of a substrate 60 having a significantly lower dielectric constant than the waveguides 61 and 62, in order to propagate optical waves in the first and second modes, respectively. Dielectric coupling elements, the dielectric sheets 63, are arranged to produce "raised square wave" type of spatially periodic coupling with spatial period $\lambda_m$ at midband given by Eq. 1 above. Here $\lambda_1$ and $\lambda_2$ are the guide wavelengths at midband in waveguide 61 and 62, respectively.

FIG. 7 shows the front view of solid rectangular dielectric rectangular waveguides 71 and 72 which support first and second electromagnetic modes, respectively. Typically, these waveguides 71 and 72 are mechanically supported by relatively low dielectric material, such as foamed material (not shown). The dielectric in the waveguides 71 and 72 typically is polyethylene, which has a relatively high dielectric constant in order to propagate the first and second modes. The waveguides 71 and 72 are dimensioned to support, respectively, these first and second modes having nonvanishing electric fields in the $y$ direction. Typically, these modes are for waves in the microwave region of the electromagnetic spectrum. Moreover, these modes are coupled by means of spatially periodic coupling slots in the dielectric coupling sheet 73, as shown in cross-sectional view FIG. 7A. These coupling slots are all parallel except that their slant from right-to-left is periodically reversed to a slant from left-to-right. This reversal of slant takes place every distance interval equal to $\lambda_m/2$ along the waveguides. This gives rise to a displacement, advantageously equal to $\lambda_g/2$, between the first slot in a given spatial period $\lambda_m/2$ and the last slot in the previous spatial period $\lambda_m/2$. Here, $\lambda_g$ denotes the approximate guide wavelength of either the first mode, or the second mode, or an average thereof. Moreover, $\lambda_m$ is chosen to satisfy Eq. 1 above at midband according to the invention; where now $\lambda_1$ and $\lambda_2$ are the guide wavelengths of the first and second modes, respectively, the waveguides 71 and 72, respectively.

The reversal of slant of the slots effectively reverses the algebraic sign of the coupling coefficient. Moreover, as shown in FIG. 7A, the thickness of the slots may be sinusoidally tapered with distance along the $z$ axis of the waveguides, in order to produce a sinusoidal coupling coefficient $C_{21}$. Alternatively, sinusoidal coupling may be obtained by means of a sinusoidal taper of the thickness of the dielectric sheet 73 in the $x$ direction in conjunction with uniform thickness in the $z$ direction. Of course, if "symmetrical square wave" coupling is desired, no such tapering need be built into the slots in the coupling sheet 73; the spatially periodic reversal in slant direction of the slots alone is sufficient to reverse the sign of the coupling periodically. In any event, the coupling structure illustrated in FIG. 7A may be used for filtering purposes, as generally described above in connection with FIG. 1.

FIG. 8 shows a schematic side view, partly in cross-section of a travelling wave electron tube structure 80 consisting of a "slow-wave" structure, the helix 81, along which is launched an electromagnetic wave mode from the input waveguide 82 to the output waveguide 84, as known in the art. Spatially periodic metallic shielding 83 produces a spatial period $\lambda_m$ in the weak passive coupling ("raised square wave" type) between the electromagnetic wave and the electron beam in the region within the helix 81. Typically, a signal to be amplified modulates the flux of this electron beam prior to its entry into this region, thereby creating a space charge wave mode in the electron beam in this region.

It should be understood that the shielding 83 is insulated electrically from the helix 81. Here again, the spatial period $\lambda_m$ of the shielding 83 is given by Eq. 1 above according to the invention, where now $\lambda_2$ is the wavelength of the electromagnetic wave along the helix 81 and $\lambda_1$ is the wavelength of the space charge wave of the electron beam in the said region in the travelling wave tube 80. The periodic coupling furnished by the arrangement shown in FIG. 8 is useful for obtaining optimum transfer of energy from a space charge waves in the electron beam to the electromagnetic wave in case these waves have different propagation constants, hence different wavelengths, in the travelling wave tube 80. Indeed, complete transfer at midband may be obtained if the number N of spatial periods in the shielding 83 satisfies Eq. 9 above.

Instead of the spatially periodic shielding 83, any type of spatially periodic loss may be introduced in the travelling wave tube, having a spatial periodicity $\lambda_m$ which satisfies Eq. 1 according to the invention.

While this invention has been described in terms of specific embodiments, it should be obvious that many modifications are possible within the scope of the invention. For example, various other types of reciprocal and nonreciprocal waveguides supporting various modes known in the art may be used, with the spatially periodic coupling of two dissimilar modes in accordance with the invention; that is, with a coupling coefficient having a spatial periodicity which satisfies Eq. 1 or its equivalent Eq. 2 above.

What is claimed is:
1. An electromagnetic wave coupler which comprises:
   (a) first means for supporting first and second electromagnetic wave modes having the same frequency and having unequal propagation constants $k_1$ and $k_2$, respectively; and
   (b) second means for weakly and passively periodically coupling said first and second wave modes, said second means characterized by a coefficient of coupling of at least two spatial periods having a significant Fourier component corresponding to a spatial periodicity substantially equal to the magnitude of $2\pi/(k_1-k_2)$.
2. A wave coupler according to claim 1 in which said spatial periodicity is equal to the magnitude of

$$2\pi/(k_1-k_2)$$

at midband.

3. A wave coupler according to claim 1 in which the said coefficient of coupling has a spatial periodicity equal to the magnitude of $2\pi/(k_1-k_2)$ at midband.

4. A wave coupler according to claim 1 in which the effective coupling coefficient multiplied by L is at least approximately equal to $\pi/2$, where L is the length of the region in which said coupling coefficient exists.

5. A directional coupler according to claim 1 in which the first means comprise a first rectangular waveguide for supporting the first mode, and a second circular waveguide for supporting the second mode; and in which the second-mentioned means for coupling said first and second modes include an array of slots having said spatial periodicity in a common wall between said first and second waveguide means.

6. A directional coupler in accordance with claim 5 in which the first mode is the rectangular electromagnetic $TE_{10}$ mode and the second mode is the circular electromagnetic $TE_{01}$ mode.

7. A directional coupler in accordance with claim 1 in which the first means comprise a first circular waveguide for supporting said first mode, and a second circular waveguide for supporting said second mode; and in which the second-mentioned means for coupling said first and second modes include an array of slots characterized by the said spatial periodicity in a common wall between said first and second waveguide means.

8. A directional coupler according to claim 7 in which said first mode is the circular electromagnetic $TE_{11}$ and said second mode is the circular electromagnetic $TE_{01}$.

9. A directional coupler according to claim 1 in which the first means comprise a circular waveguide which can support said first and second modes, and in which the second-mentioned means for coupling said first and second modes includes an array of dielectric sheets located within said circular waveguide.

10. A directional coupler in accordance with claim 9 in which each dielectric sheet in said array is situated with respect to its neighboring sheet on the opposite side of a plane containing a diameter of said circular waveguide; and in which the first mode is the circular electromagnetic $TE_{11}$ and the second mode is the circular electromagnetic $TE_{01}$.

11. A directional coupler according to claim 1 in which the first means comprise a rectangular waveguide which can support said first and second modes, and in which the second-mentioned means for coupling said first and second modes include an array of dielectric sheets located within said rectangular waveguide.

12. A directional coupler according to claim 11 in which each dielectric sheet is situated with respect to its neighboring sheet in the said array on the opposite side of a centerline of the said rectangular waveguide.

13. A directional coupler in accordance with claim 12 in which said first mode is the rectangular electromagnetic $TE_{10}$ and said second mode is the rectangular electromagnetic $TE_{20}$.

14. A directional coupler in accordance with claim 1 in which the first means include a first tubular dielectric region forming a first waveguide and a second tubular dielectric region forming a second waveguide, and in which the second-mentioned means for coupling said first and second modes include an array of dielectric coupling elements.

15. A directional coupler in accordance with claim 14 in which said dielectric coupling elements are essentially dielectric strips; all said dielectric strips, within each interval along the first means equal to one-half the said spatial periodicity, being mutually parallel; and in which the dielectric strips in each said interval are slanted with respect to the dielectric strips in a neighboring interval.

16. A direction coupler in accordance with claim 14 in which said dielectric coupling elements comprise a plurality of dielectric sheets, each of said sheets having a length approximately equal to one-half the said spatial periodicity.

17. A directional coupler in accordance with claim 14 in which each of said dielectric regions is embedded in a substrate having a significantly lower dielectric constant than the dielectric constant of said dielectric regions.

18. A directional coupler according to claim 1 in which the first means include a first tubular dielectric region forming a first waveguide for supporting the first mode and a second tubular dielectric region forming a second waveguide for supporting the second mode, and in which the second-mentioned means for coupling the said first and second modes include an array of slots in a dielectric coupling sheet.

19. A directional coupler according to claim 18 in which all said slots are mutually parallel, within each interval along the first means equal to one-half the said spatial periodicity; and in which the said slots in each said interval are slanted with respect to the slots in a neighboring interval.

20. In a travelling wave tube, a coupler which comprises:
  (a) means for providing a beam of electrons in said tube, said beam characterized by a space charge wave in a first mode having a propagation constant $k_1$,
  (b) a slow electromagnetic wave structure for supporting an electromagnetic wave in a second mode having a propagation constant $k_2$, said first and second modes being coupled with a spatially periodic weak effective coupling coefficient having at least two spatial periods, the spatial periodicity along said tube of said coefficient having a square wave type of spatial periodicity with a significant Fourier component corresponding to a spatial periodicity at least approximately equal in magnitude to $2\pi(k_1-k_2)$.

21. In a travelling wave tube, a coupler according to claim 20 in which the second means for coupling the first and second modes include a spatially periodic shielding of the said slow electromagnetic wave structure from the electron beam in said tube, said shielding characterized by the said spatial periodicity.

22. In a travelling wave tube, a coupler according to claim 20 in which the effective value of the coupling coefficient multiplied by L is at least approximately equal to $\pi/2$, where L is the length of the region in which said coupling coefficient exists.

References Cited

UNITED STATES PATENTS

| | | | |
|---|---|---|---|
| 2,748,350 | 5/1956 | Miller | 333—21 X |
| 2,834,944 | 5/1958 | Fox | 333—10 |
| 2,926,281 | 2/1960 | Ashkin | 315—3.6 |
| 2,948,864 | 8/1960 | Miller | 333—10 |
| 3,238,473 | 3/1966 | Salzberg | 333—10 |

PAUL L. GENSLER, Primary Examiner

U.S. Cl. X.R.

333—10, 21, 73; 350—96